US010259483B2

(12) United States Patent
Plested et al.

(10) Patent No.: US 10,259,483 B2
(45) Date of Patent: Apr. 16, 2019

(54) BRAKING SYSTEM FOR A STROLLER (71) Applicant: Diono, LLC, Sumner, WA (US)

(72) Inventors: Nigel Plested, London (GB); Paul Richardson, London (GB)

(73) Assignee: Diono, LLC, Sumner, WA (US)

( * ) Notice: Subject to any disclaimer, the term of this patent is extended or adjusted under 35 U.S.C. 154(b) by 0 days.

(21) Appl. No.: 15/668,630

(22) Filed: Aug. 3, 2017

(65) Prior Publication Data
US 2018/0043918 A1    Feb. 15, 2018

Related U.S. Application Data (60) Provisional application No. 62/373,211, filed on Aug. 10, 2016.

(51) Int. Cl.
*B62B 9/08*    (2006.01)
*B60T 11/04*    (2006.01)
(Continued)

(52) U.S. Cl.
CPC .............. *B62B 9/087* (2013.01); *B60T 1/005* (2013.01); *B60T 7/045* (2013.01); *B60T 11/046* (2013.01); *B62B 9/082* (2013.01)

(58) Field of Classification Search
CPC ....... B62B 9/082; B62B 9/087; B62B 5/0433; B62B 5/0461; B60T 11/046
(Continued)

(56) References Cited

U.S. PATENT DOCUMENTS 4,527,665 A * 7/1985 Shamie .................. B62B 9/087
188/200
5,368,133 A * 11/1994 Yang .................. B60B 33/0042
16/35 R
(Continued)

FOREIGN PATENT DOCUMENTS

GB    2480117 A    11/2011

OTHER PUBLICATIONS

International Search Report and Written Opinion for PCT/US2017/45579; dated Oct. 18, 2017.

*Primary Examiner* — Emma K Frick
*Assistant Examiner* — Brian L Cassidy
(74) *Attorney, Agent, or Firm* — Stetina Brunda Garred and Brucker; Mark B. Garred (57) ABSTRACT

A stroller including a pair of wheels and a cross bar extending therebetween. A pedal is coupled to the cross bar, and is transitional relative thereto between locked and unlocked configurations. A pair of braking pins is operatively coupled to the pedal. Each braking pin is transitional relative to a corresponding wheel between locked and unlocked configurations. Each braking pin is engaged with the corresponding wheel when the braking pin is in the locked configuration, and each braking pin is disengaged with the corresponding wheel when in the unlocked configuration. The braking pins are coupled to the pedal such that movement of the pedal from the unlocked configuration to the locked configuration causes the braking pins to transition to their respective locked configurations, and movement of the pedal from the locked configuration to the unlocked configuration causes the braking pins to transition to their respective unlocked configurations.

17 Claims, 9 Drawing Sheets

(51) Int. Cl.
*B60T 1/00* (2006.01)
*B60T 7/04* (2006.01)

(58) Field of Classification Search
USPC .......................................................... 280/642
See application file for complete search history.

(56) References Cited

U.S. PATENT DOCUMENTS

| | | | |
|---|---|---|---|
| 5,460,399 A | 10/1995 | Baechler et al. | |
| 5,765,665 A | 6/1998 | Cheng et al. | |
| 6,308,805 B1 | 10/2001 | Lan | |
| 6,341,672 B1 | 1/2002 | Yang et al. | |
| 6,742,791 B2 | 6/2004 | Lan | |
| 7,059,452 B2 | 6/2006 | Chen | |
| 7,367,432 B2 * | 5/2008 | Chen ......................... | B62B 7/08 188/19 |
| 7,383,925 B2 | 6/2008 | Chen | |
| 7,537,093 B2 | 5/2009 | Chen | |
| 7,708,119 B2 | 5/2010 | Chen | |
| 7,757,819 B2 | 7/2010 | Chen | |
| 8,016,301 B2 * | 9/2011 | Figel ........................ | A61G 1/04 280/47.34 |
| 8,157,286 B2 | 4/2012 | Lai | |
| 8,201,667 B2 | 6/2012 | Chen et al. | |
| 8,316,999 B2 | 11/2012 | Solinski et al. | |
| 8,376,374 B2 * | 2/2013 | Zhong ..................... | B60B 1/006 188/20 |
| 8,418,314 B2 * | 4/2013 | Lai ....................... | B60B 33/0086 16/18 R |
| 8,418,816 B2 | 4/2013 | Chen | |
| 8,490,757 B2 | 7/2013 | Chen et al. | |
| 8,550,478 B2 * | 10/2013 | van Petegem ........... | B62B 5/04 188/20 |
| 9,067,613 B2 | 6/2015 | Yi et al. | |
| 9,174,662 B2 | 11/2015 | Zhang | |
| 9,199,660 B2 | 12/2015 | Cheng | |
| 2007/0013169 A1 * | 1/2007 | Dotsey ..................... | B62B 7/08 280/642 |
| 2007/0024029 A1 * | 2/2007 | Dotsey ................... | B62B 7/086 280/642 |
| 2008/0042487 A1 | 2/2008 | Chen et al. | |
| 2009/0200123 A1 * | 8/2009 | Wang ..................... | B60T 7/107 188/162 |
| 2011/0083928 A1 * | 4/2011 | Liao ..................... | B62B 5/0438 188/2 D |
| 2012/0085602 A1 * | 4/2012 | Liao ..................... | B60T 11/046 188/167 |
| 2014/0070505 A1 | 3/2014 | Yi et al. | |
| 2014/0196991 A1 * | 7/2014 | Fite ........................ | B62B 9/085 188/69 |
| 2016/0375885 A1 * | 12/2016 | Chelaidite ............ | B60T 11/046 188/156 |

\* cited by examiner

BRAKING SYSTEM FOR A STROLLER

CROSS-REFERENCE TO RELATED APPLICATIONS

This application claims the benefit of U.S. Provisional Application Ser. No. 62/373,211, filed Aug. 10, 2016, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a braking system, and more specifically to a braking system for a stroller.

2. Description of the Related Art

Strollers are well known and are commonly used for transporting a child. A typical stroller generally includes a support frame assembly attached to a plurality of wheels, and a child support for supporting a child in either a sitting or lying-down position. The support frame assembly typically includes a handlebar or a pair of handles, which allow an adult-user to push or pull the stroller over an underlying support surface, such as a sidewalk, trail, road, or the like.

During the course of using the stroller, circumstances may arise which requires the stroller to be stopped, and in some instances, the adult-user may release their hands from the stroller. For instance, the adult-user may have to reach into a bag to find a toy for the child. In some circumstances, although the child may be secured within the stroller, without the adult-user maintaining a firm grip on the stroller, it is possible that the stroller may be susceptible to external forces, which may cause inadvertent movement of the stroller. For instance, if the stroller is on an incline, the stroller may roll down the incline if the adult-user does not hold onto the stroller. Alternatively, if the stroller is bumped, the stroller may roll forward, which may place the child in harm's way.

Accordingly, in view of the foregoing, most strollers are equipped with at least one brake which locks one or more of the wheels of the stroller. For instance, the stroller may include a brake which locks a single rear wheel of the stroller, or alternatively, the stroller may include a pair of brakes which interface with respective ones of the rear wheels. The brakes typically include a lever, which is actuated by the user's foot, wherein the lever is lowered by the user's foot to activate the brake, and the lever is raised by the user's foot to deactivate the brake.

Many conventional stroller braking systems suffer from various deficiencies. One deficiency is that the braking system may only operate on a single wheel, rather than multiple wheels, and thus, the braking force created by such systems may be insufficient. Another deficiency of conventional stroller braking systems is that the required foot actuation may be very difficult for the adult-user to execute. For instance, raising and lower a brake lever with the user's toes may be difficult.

Accordingly, there is a need in the art for a stroller braking system which is actuated by a simple gesture/movement by the user for activating multiple braking mechanisms on respective wheels of the stroller. Various aspects of the present disclosure address this particular need, as will be discussed in more detail below.

BRIEF SUMMARY

In accordance with one embodiment of the present disclosure, there is provided a stroller having a centrally located (e.g., easy to reach) pedal, which is foot-actuated, for selectively actuating a braking system for the stroller. The pedal may be configured to allow the same gesture to be used to actuate and de-actuate the braking system. For instance, the gesture may include pressing down on the pedal, wherein an initial pressing of the pedal actuates the braking system and the braking force provided thereby, and a subsequent pressing of the pedal de-actuates the braking system.

According to one embodiment, the stroller includes a pair of wheels, and a cross bar extending between the pair of wheels. A pedal is coupled to the cross bar, and is selectively transitional relative to the cross bar between an unlocked configuration and a locked configuration. A pair of braking pins is operatively coupled to the pedal, with each braking pin being transitional relative to a respective one of the pair of wheels between an unlocked configuration and a locked configuration. Each braking pin is engaged with the respective one of the pair of wheels when the braking pin is in the locked configuration, and each braking pin is disengaged with the respective one of the pair of wheels when the braking pin is in the unlocked configuration. The pair of braking pins are coupled to the pedal such that movement of the pedal from the unlocked configuration to the locked configuration causes the pair of braking pins to transition to their respective locked configurations, and movement of the pedal from the locked configuration to the unlocked configuration causes the pair of braking pins to transition to their respective unlocked configurations.

The pedal may be biased toward the unlocked configuration. The stroller may include a pedal locking mechanism coupled to the pedal and the cross bar, with the pedal locking mechanism being configured to retain the pedal in the locked configuration in response to the pedal being transitioned to the locked configuration.

The stroller may include at least one braking cable operatively coupling the pedal and the pair of braking pins. The at least one braking cable may include a pair of braking cables, with each braking cable extending between the pedal and a respective one of the braking pins.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a braking system for a stroller and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a stroller 10. As will be described in more detail below, various unique aspects of the stroller 10 relate to a foot-actuated braking system, including a single braking pedal, which actuates a pair of braking pins for locking the rear wheels of the stroller 10.

Figure 1:
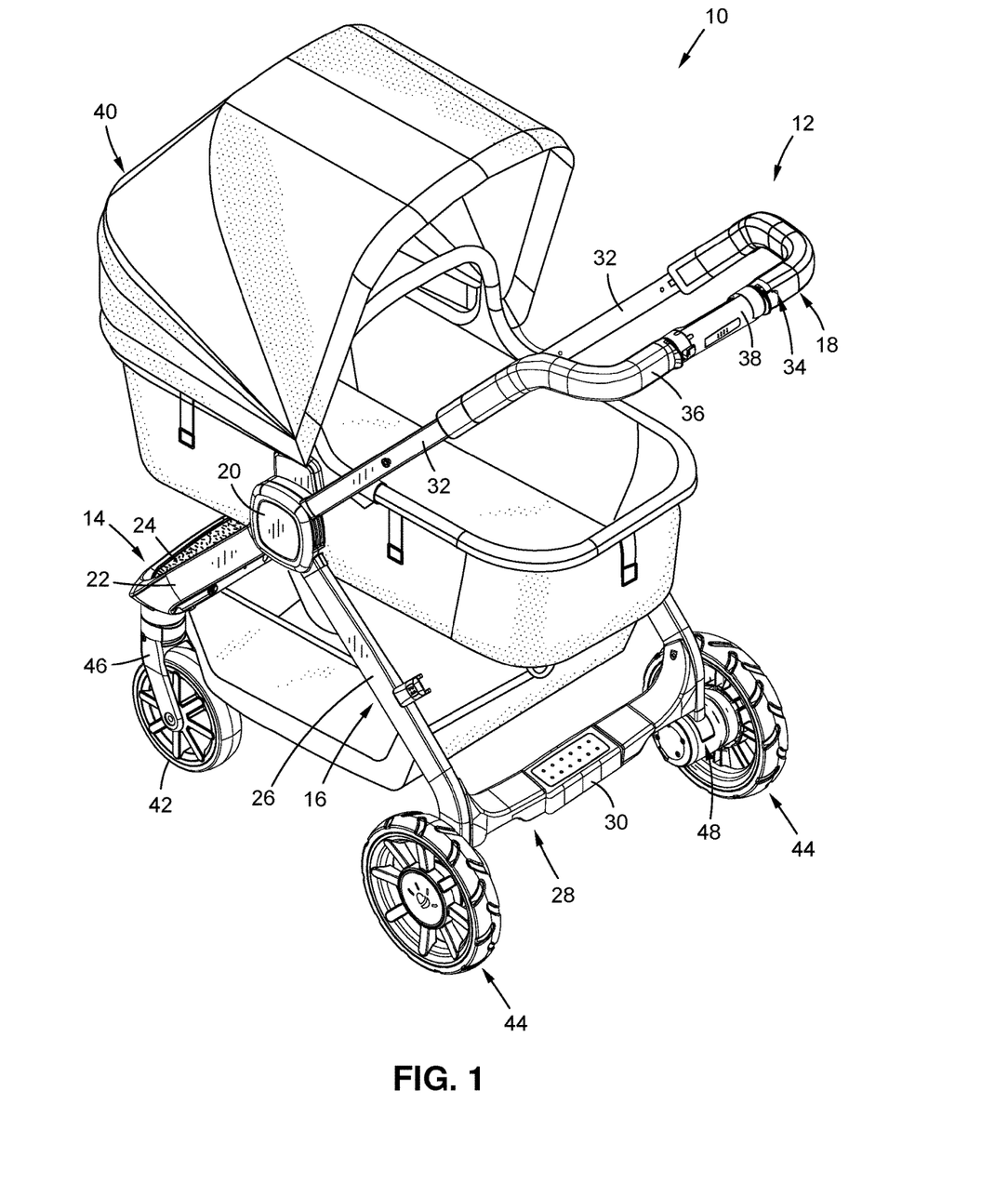
FIG. 1 is an upper perspective view of a stroller having a braking system according to one aspect of the present disclosure.

The stroller 10 includes a support frame assembly 12 having a front frame 14, a rear frame 16, and a handle frame 18, with the front frame 14, rear frame 16, and handle frame 18 being pivotally interconnected to each other via a pair of hubs 20 disposed on opposed sides of the stroller 10. The front frame 14 includes a pair of side rails 22, with each side rail 22 extending from a respective hub 20. Extending between the pair of side rails 22 is a front rail 24, which may be configured to serve as a footrest when the stroller 10 is used with older children.

The rear frame 16 includes a pair of side rails 26, with each side rail 26 extending from a respective hub 20. A brake bar 28 extends between the pair of side rails 26, with the brake bar 28 including a braking pedal 30 adapted to be actuated by a user's foot. The particulars of the brake bar 28 will be described in more detail below.

The handle frame 18 includes a pair of side rails 32, with each side rail 32 extending from a respective hub 20. A handle 34 extends between the pair of side rails 32, with the handle 34 being configured to enable a user to push or pull the stroller 10. The handle 34 includes a handle base 36 and a handle actuator 38 moveable relative to the handle base 36. The handle base 36 may be movably coupled to the side rails 32 to enable adjustment in the height of the handle base 36 over an underlying support surface. More specifically the handle base 36 may be translated toward the hubs 20 to lower the height of the handle base 36 to accommodate shorter users, and conversely, the handle base 36 may be translated away from the hubs 20 to accommodate taller users.

The handle actuator 38 is designed to be manually actuatable to enable selective transition of the support frame assembly 12 from a deployed configured toward a folded configuration. As shown in FIG. 1, the support frame assembly 12 is in the deployed position. When the support frame assembly 12 is in the deployed configuration, the side rail 22 and side rail 32 coupled to a common hub 20 extend in a generally co-linear relationship to each other, with the side rail 26 extending generally perpendicularly to the side rails 22, 32. When the support frame assembly 12 is in the folded configuration, side rails 22, 26, 32 extend in generally parallel relation to each other. According to one embodiment, the support frame assembly 12 transitions between the deployed and folded configurations via a pivoting interconnection between the front frame 14, rear frame 16 and handle frame 18 and the hubs 20. In particular, the front frame 14 and the handle frame 18 pivot toward the rear frame 26, albeit in opposite rotational directions, as the support frame assembly 12 transitions from the deployed configuration toward the folded configuration. Conversely, the front frame 14 and handle frame 18 pivot away from the rear frame 26, again, in opposite rotational directions, as the support frame assembly 12 transitions from the folded configuration toward the deployed configuration. The hubs 20 may include a locking mechanism (not shown) which locks the front frame 14, rear frame 16, and handle frame 18 when the support frame assembly 12 is in the deployed configuration. Before the support frame assembly 12 can be transitioned from the deployed configuration toward the folded configuration, the locking mechanism is deactivated to enable the pivotal movement described above. The locking mechanism is operatively coupled to the actuator 38, such that actuation of the actuator 38 deactivates the locking mechanism. According to one embodiment, the actuator 38 is a trigger-and-twist type actuator which rotates relative to the handle base 36. The actuator 38 may be configured to assume a normally locked configuration relative to the handle base 36 via an actuator "trigger" or lock, which prevents rotational movement of the actuator 38 relative to the handle base 36. The lock is deactivated to enable rotational movement of the actuator 38 relative to the handle base 36, which in turn, results in deactivation of the locking mechanism in the hubs 20. According to one embodiment, the locking mechanism associated with each hub 20 includes a locking pin which is operatively coupled to the actuator 38 via a corresponding cable extending between the locking pin and the actuator 38.

Those skilled in the art will recognize that the foldable nature of the support frame assembly 12 described above is optional only, and thus, the scope of the present disclosure also encompasses support frame assemblies which may not be foldable, or support frame assemblies which fold in a different manner.

The stroller 10 includes a child supporting element 40 detachably coupled to the support frame assembly 12. The child supporting element 40 may include several different structures, depending on the size of the child. For instance, the child supporting element 40 may include a bassinet-like attachment, as shown in FIG. 1, particularly suited for infants. The child supporting element 40 may also include a car-seat, which may be detached from a car-seat base, and attached to the support frame assembly 12 to enable seamless transition of a child from a vehicle to the stroller 10. It is also contemplated that the child supporting element 40 may be a stroller seat for accommodating older children. A seat frame for a stroller seat may be attachable to the support frame assembly 12, wherein different portions of the seat frame may articulate relative to each other to vary the degree of recline. The support frame assembly 12 may be configured to allow a user to swap out one child supporting element 40 for another to allow to customize the stroller 10 based on the age, weight, and needs of the particularly child. Furthermore, detachment of the child supporting element 40 from the support frame assembly 12 may also facilitate storage of the stroller 10 in the trunk of a vehicle or in a user's home.

The stroller 10 further includes a plurality of wheels to facilitate movement of the stroller 10 over an underlying support surface (e.g., sidewalk, floor, trail, road, path, etc.). More specifically, the exemplary stroller 10 includes a pair of front wheels 42 and a pair of rear wheels 44. Each front wheel 42 is coupled to a respective side portion of the front frame 12 by a front caster 46. According to one embodiment, the interconnection between the front frame 12 and each front caster 46 allows the front caster 46 to rotate or swivel 360 degrees relative to the front frame 12 about an axis which is generally perpendicular to the underlying support surface to facilitate steering or turning the stroller 10. The rear wheels 44 are coupled to respective side portions of the rear frame 16 via corresponding rear casters 48, which will be described in more detail below.

Figure 2:
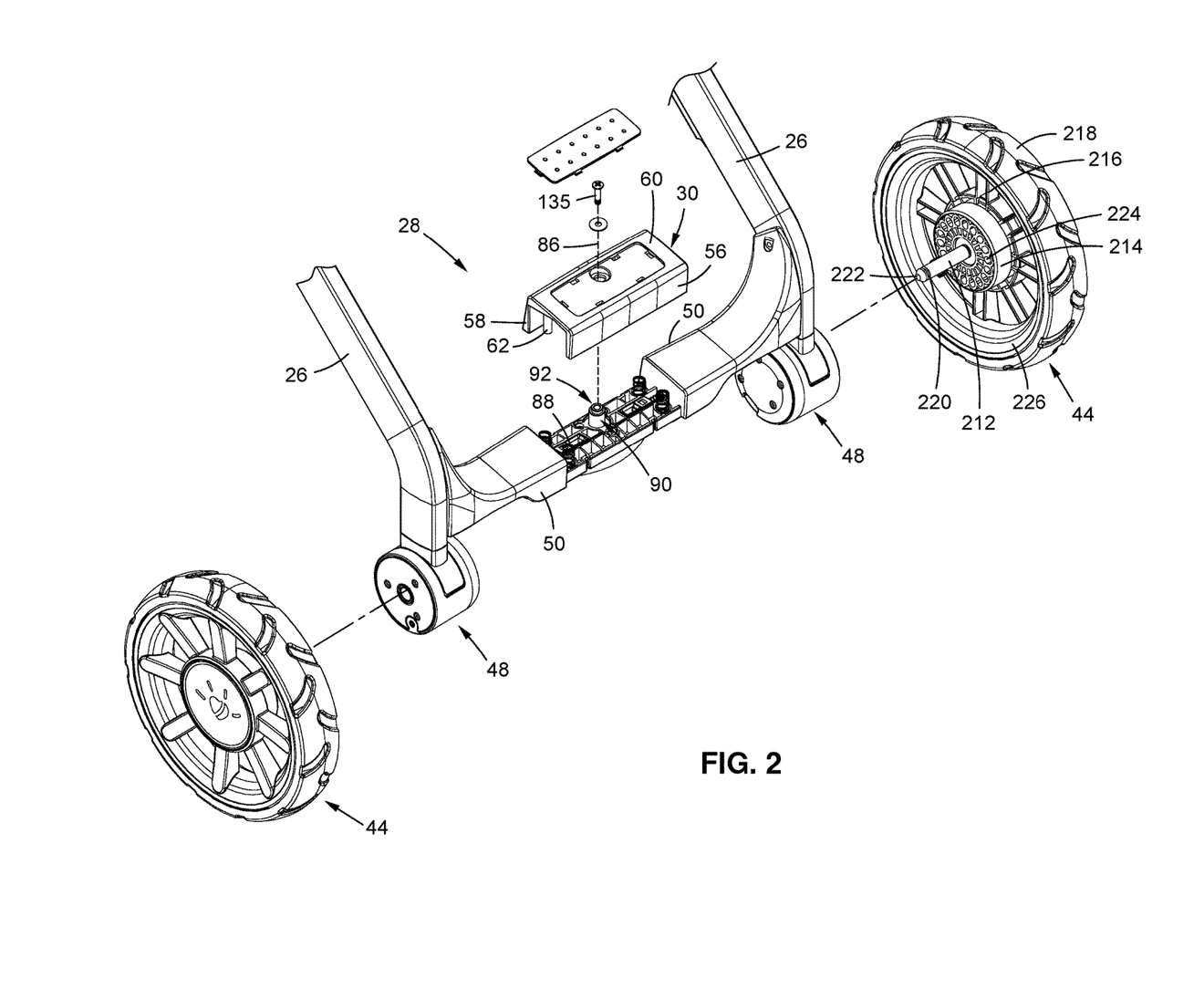
FIG. 2 is an exploded upper perspective view of a rear frame assembly, which forms a portion of the stroller depicted in FIG. 1.
Figure 3:
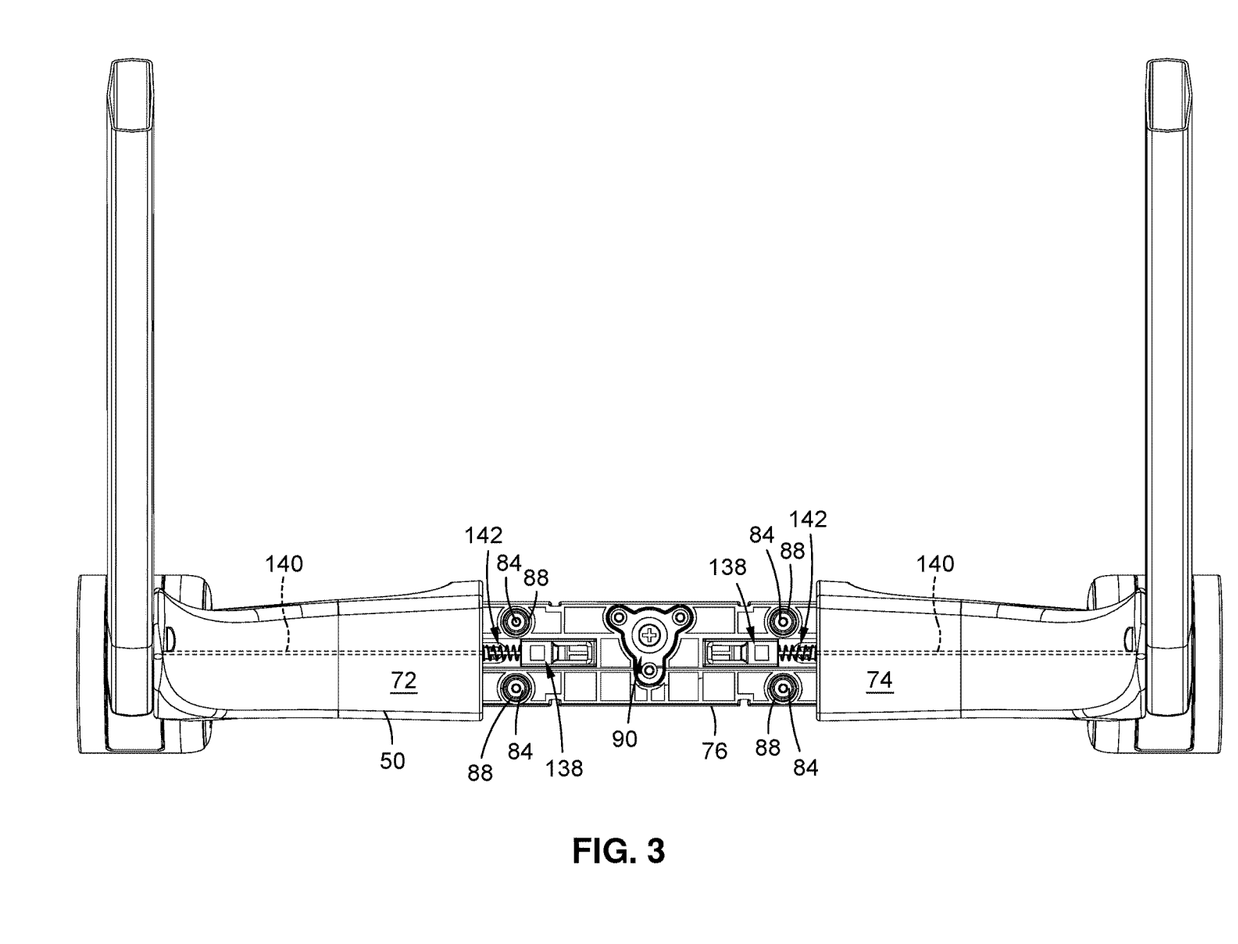
FIG. 3 is a top view of the rear frame assembly with a brake pedal removed therefrom to depict internal components utilized for braking the stroller.
Figure 4:
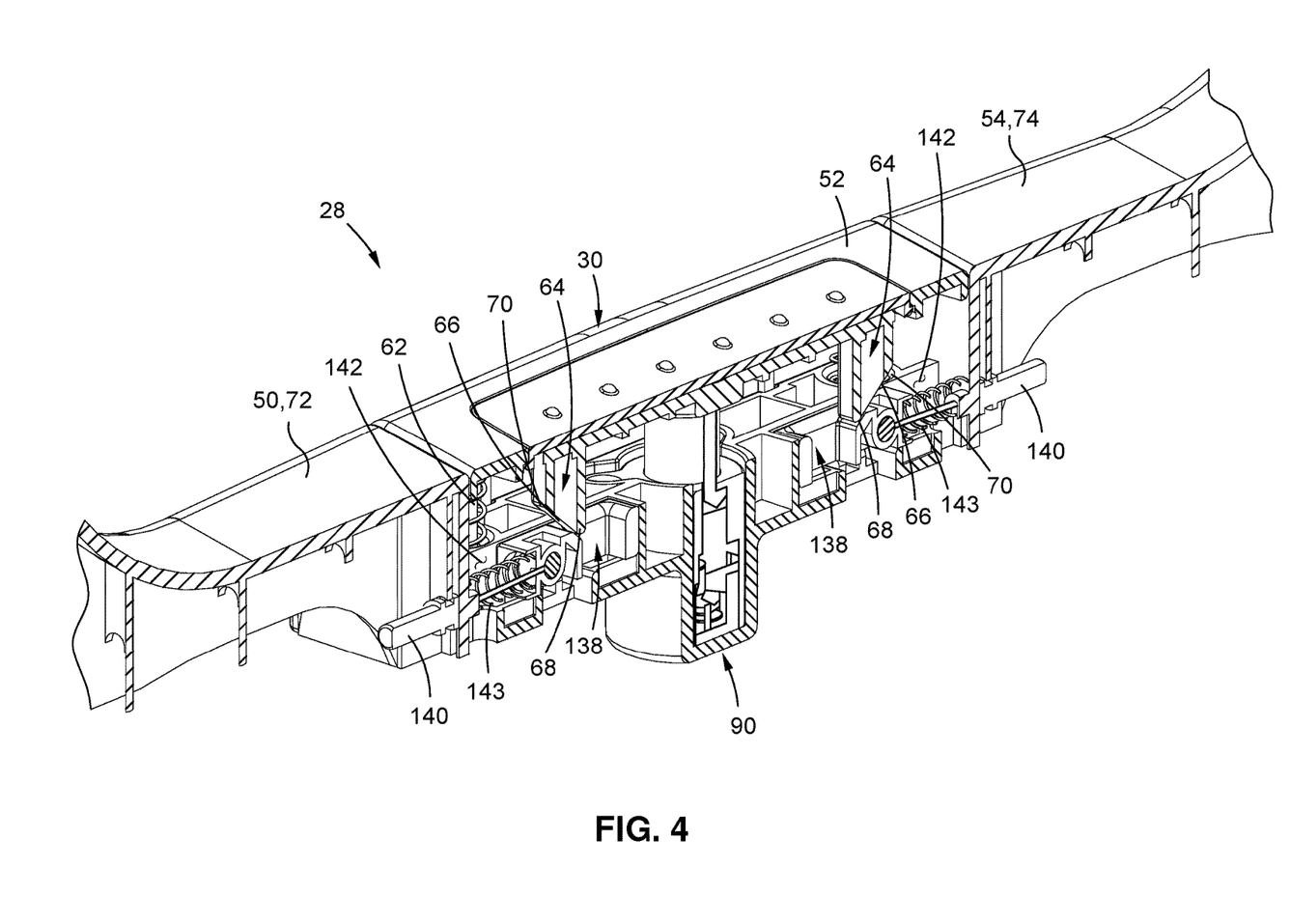
FIG. 4 is an upper perspective cross sectional view of a brake bar.

As noted above, the stroller 10 includes a braking system which is actuated by the brake pedal 30. The particulars of the braking system will now be described in more detail. Referring now specifically to FIGS. 2-5, there is shown various view of a rear assembly, including the rear frame 16, rear wheels 44, and rear casters 48. As noted above, the rear frame 16 includes a brake bar 28 comprising the brake pedal 30 and a cross bar 50, with the brake pedal 30 being moveable relative to the cross bar 50 between an unlocked configuration and a locked configuration. The brake pedal 30 is operatively coupled to the rear wheels 44 such that placement of the brake pedal 30 in the unlocked configuration allows the rear wheels 44 to freely rotate relative to the rear frame 16, and placement of the brake pedal 30 in the locked configuration restricts rotation of the rear wheels 44 relative to the rear frame 16. FIG. 3 shows a top view of the brake bar 28 with the pedal 30 removed therefrom, while FIG. 4 is a cross sectional view of the brake bar 28 showing the pedal 30 engaged with the cross bar 50, with the pedal 30 being in the unlocked configuration. In particular, when the pedal 30 is in the unlocked configuration, an upper surface 52 of the pedal 30 is substantially flush with an upper surface 54 of the cross bar 50. In the locked configuration, the upper surface 52 of the pedal 30 is recessed below the upper surface 54 of the cross bar 50.

The pedal 30 includes a front wall 56, an opposing rear wall 58, and an upper wall 60 extending between the front and rear walls 56, 58. Extending from the upper wall 60, and in spaced relation to the front and rear walls 55, 58, are four guide posts 62, and a pair of camming posts 64. According to one embodiment the guide posts 62 extend from the upper wall 60 by a first distance while the most distal portion of each camming post 64 extends from the upper wall 60 by a second distance which is less than the first distance. Each camming post 64 extends from the upper wall 60 and terminates at a distal camming surface 66, which is angled relative to the axis along which the camming post 64 extends from the upper wall 60. In particular, each camming post 64 includes a medial end 68 facing the middle of the pedal 30 and a lateral end 70 facing away from the middle of the pedal 30, with the medial end 68 extending farther away from the upper wall 60 than the lateral end 70. The camming surface 66 extends between the medial and lateral ends 68, 70, with the difference in length of the ends 68, 70 resulting in the angled configuration of the camming surface 66. The importance of the angled camming surface 66 will be described in more detail below.

The cross bar 50 includes a first side portion 72 and a second side portion 74, spaced apart from each other by a middle portion 76. The side portions 72, 74 and middle portion 76 collectively define a gap 78, the size of which is complimentary to the pedal 30. More specifically, the gap 78 extends between respective ends 80, 82 of the side portions 72, 74. The middle portion 76 includes four recesses or bores 84, with each bore 84 being sized to receive a respective guide post 62 on the pedal 30. Thus, the interaction between the guide posts 62 and the bores 84 allows restricts movement of the pedal 30 relative to the cross bar 50 to movement along an axis 86, which is parallel to the direction along which the bores 84 extend. The axis 86 may also be generally perpendicular to the axis about which the rear wheels rotate.

Extending around each guide post 62 is a spring 88, which engages with the pedal 30 and the cross bar 50 to bias the pedal 30 toward the unlocked configuration. Thus, when the user presses on the pedal 30 to transition the pedal 30 from the unlocked configuration toward the locked configuration, the biasing force of the springs 88 is overcome.

Figure 5:
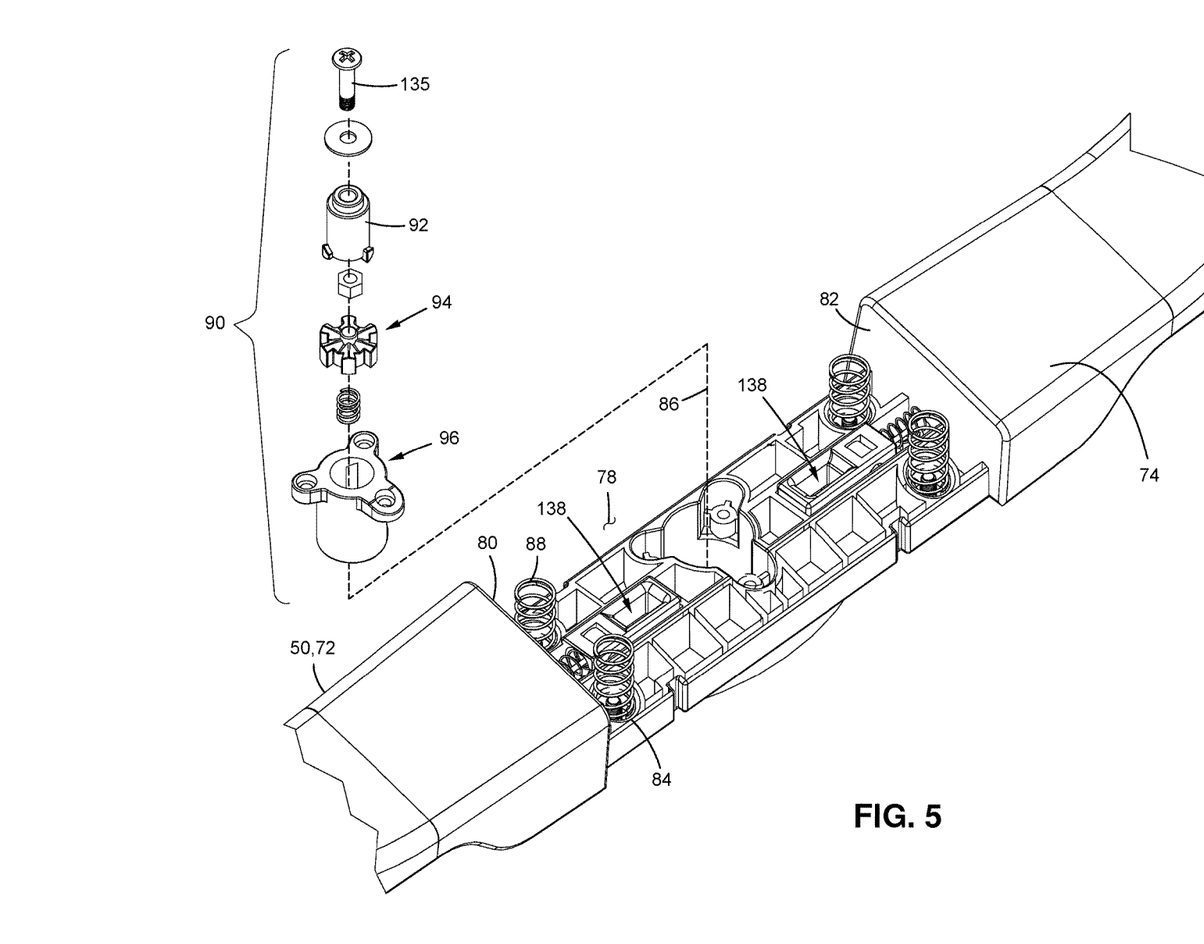
FIG. 5 is an upper perspective view of a portion of the brake bar with a pedal locking mechanism being exploded therefrom.
Figure 6:
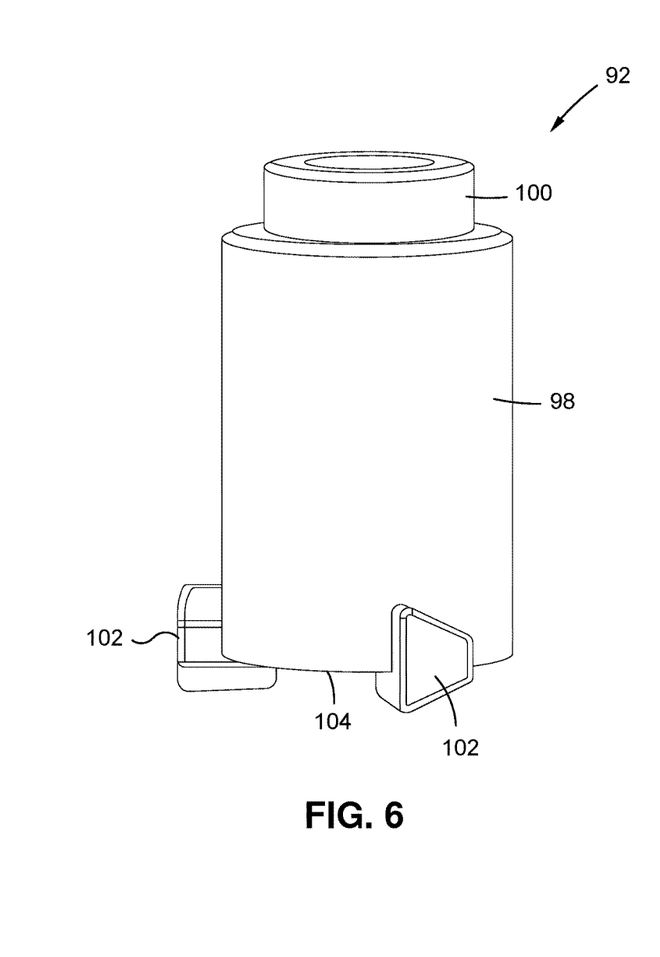
FIG. 6 is an upper perspective view of a pedal locking element of the pedal locking mechanism.
Figure 7:
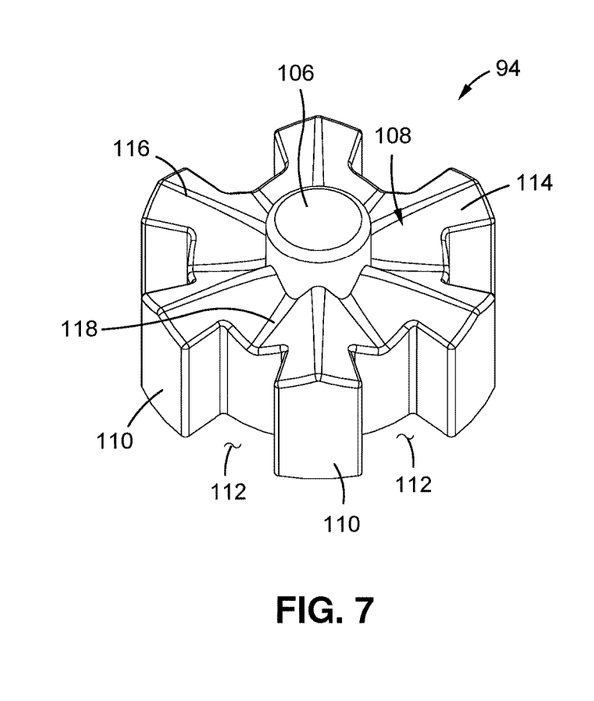
FIG. 7 is an upper perspective view of a guide element of the pedal locking mechanism.
Figure 8:
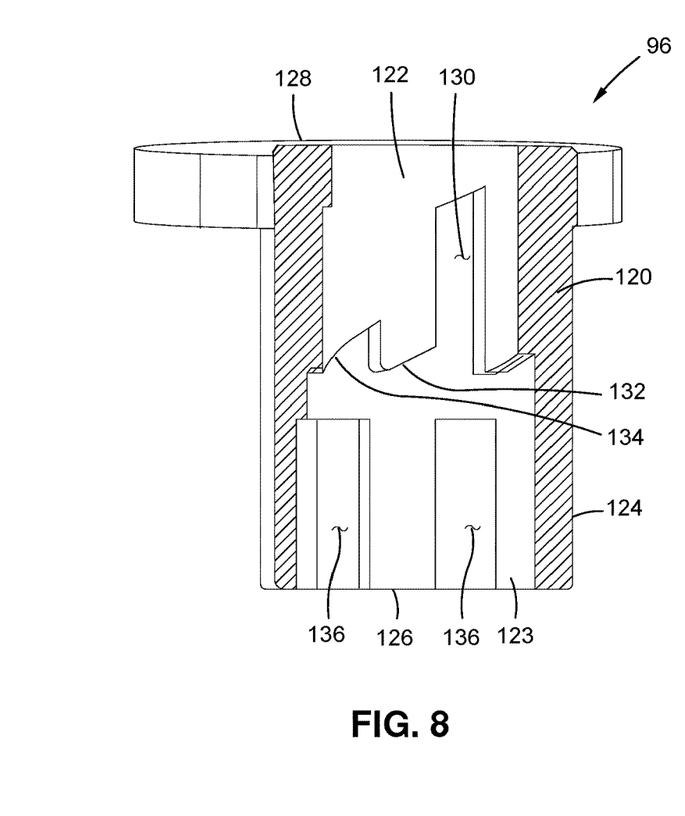
FIG. 8 is an upper perspective view of a housing of the pedal locking mechanism.

According to one embodiment, a pedal locking mechanism 90 is provided for maintaining the position of the pedal 30 when the pedal 30 is in the locked configuration. An exploded view of the pedal locking mechanism 90 is provided in FIG. 5, with the pedal locking mechanism 90 generally including a pedal locking element 92, a guide element 94, and a housing 96, with FIG. 6 showing an enlarged view of the pedal locking element 92, FIG. 7 showing an enlarged view of the guide element 94, and FIG. 8 showing an enlarged view of the housing 96. The pedal locking element 92 includes a primary cylindrical wall 98 having an outer diameter greater than a secondary cylindrical wall 100. A plurality of projections 102 coupled to the primary cylindrical wall 98 in spaced relation to each other. In the exemplary embodiment, there are three projections 102 evenly spaced about the primary cylindrical wall 98 (e.g., spaced approximately 120 degrees apart from each other). The projections 102 are positioned adjacent an end 104 of the primary cylindrical wall 98, with a portion of each projection 102 extending in an axial direction beyond the end 104, and in a radial direction radially outward of the primary cylindrical wall 102. The projections 102 are specifically configured to engage with the guide element 94 and the housing 96.

The guide element 94 includes central post 106 and a guide body 108 disposed about the post 106, with the guide body 108 having a radially castellated outer circumference including a plurality of radial projections 110 and a plurality of radial gaps 112, wherein each projection 110 is separated by an adjacent pair of gaps 112. The upper surface 114 of the guide body 108 is an undulating surface defining a plurality of apexes 116 and valleys 118 extending radially outward from the central post 106. Each apex 116 extends to a projection 110, and each valley 118 extends to a gap 112.

The housing 96 includes a cylindrical wall 120 having a first inner surface 122, a second inner surface 123, an outer surface 124, a lower end 126, and an upper end 128. The first inner surface 122 defines a first diameter, which is smaller than a second diameter defined by the second inner surface 123, and thus, the second inner surface 123 resides between the first inner surface 122 and the outer surface 124. The first inner surface 122 extends from the upper end 128 only partially toward the lower end 126, while the second inner surface 123 extends from the lower end 126 only partially toward the upper end 128. The distal edge of the first inner surface 122 is configured to define a series of grooves 130 and camming surfaces 132, 134 extending circumferentially about the housing 96. The grooves 130 and camming surfaces 132, 134 interface with the projections 102 formed on the pedal locking element 92 to control the axial and rotational position of the pedal locking element 92 relative to the housing 96. Another set of grooves 136 extends into the cylindrical wall 120 from the second inner surface 123, with such grooves 136 being sized and configured to interface with the castellated outer periphery of the guide element 94.

The pedal 30 is coupled to the pedal locking element 92 via a screw 135 or other mechanical fastener, which allows the pedal locking element 92 to rotate relative to the pedal 30. When the pedal 30 is in the unlocked configuration, the projections 102 on the pedal locking element 92 are located in an upper, closed end portion of respective ones of the grooves 130. As the user presses down on the pedal 30 to transition the pedal 30 from the unlocked configuration to the locked configuration, the pedal locking element 92 is further advanced into the housing 96 until the projections 102 interface with the undulating surface 114 of the guide element 94. The configuration of the projections 102, the undulating surface 114, and camming surface 132 on the housing 96 causes the pedal locking element 92 to slightly rotate relative to the housing 96. When the user releases pressure on the pedal 30, each projection 102 is guided into engagement with a corresponding camming surface 134, which locks the pedal 30 in the locked configuration. To unlock the pedal 30, the pedal 30 is pressed again, and the configuration of the projections 102, the undulating surface 114, and camming surface 132 on the housing 96 causes each projection 102 to become aligned with a respective groove 130, and thus, the pedal 30 may be advanced out of the housing 96, toward the unlocked configuration.

The pedal 30 is additionally configured to interface with a pair of sliders 138, with each pedal slider 138 being coupled to a braking cable 140. Each pedal slider 138 is disposed within a corresponding slot 142 formed in the middle portion 76 of the cross bar 50, with the slot 142 being larger than the pedal slider 138, which allows the pedal slider 138 to move or translate within the slot 142. Also located within the slot 142 is a biasing spring 143 which interfaces with the pedal slider 138 to urge the pedal slider 138 toward a first end of the slot 142. The pedal slider 138 is in an unlocked configuration when the pedal slider 138 is located in the first end of the slot 142, and the pedal slider 138 is in a locked configuration when the pedal slider 138 is located in an opposing second end of the slot 142. In order to move the pedal slider 138 from the first end of the slot 142 to the second end of the slot 142, the biasing force of the spring 143 must be overcome.

Figure 9:
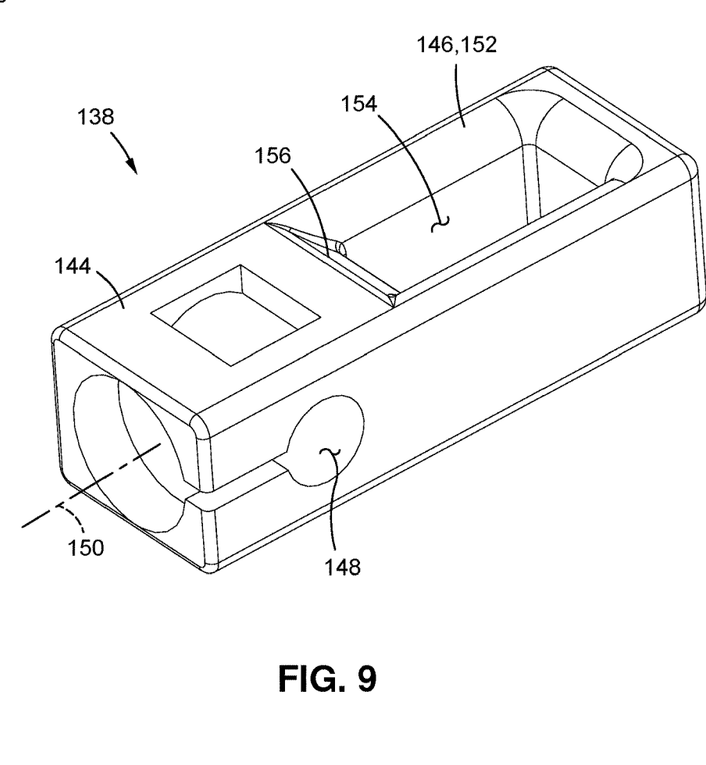
FIG. 9 is an upper perspective view of a pedal slider used in connection with the pedal and a braking cable.

Referring to FIG. 9, each pedal slider 138 is comprised of a first end portion 144 which connects to the corresponding braking cable 140, and a second end portion 146 which interfaces with a camming post 62 formed on the pedal 30. The first end portion 144 includes an opening 148 which may receive an enlarged end of the braking cable 140 to connect the braking cable 140 to the pedal slider 138. The braking cable 140 would extend out of the first end portion 144 along a cable extension axis 150. The second end portion 146 includes a wall 152 extending around a recess or opening 154, with the wall 152 including a contact surface 156 which is adapted to interface with a corresponding camming post 64 formed on the pedal 30.

When the pedal 30 is in the unlocked configuration, the camming surface 66 of the camming post 64 resides above the contact surface 156 of the pedal slider 138. However, as the pedal 30 is transitioned from the unlocked configuration toward the locked configuration, the camming surface 66 interfaces with the contact surface 156 of the pedal slider 138, with the distal end of the camming post 64 being received within the opening 154 of the pedal slider 138. The interaction between the camming post 64 and the pedal slider 138 as the pedal 30 transitions from the unlocked configuration toward the locked configuration urges the pedal slider 138 away from the first end of the slot 142 and toward the second end of the slot 142. In this regard, the biasing force of the spring 143 is overcome by such movement of the pedal 30. Conversely, as the pedal 30 is transitioned from the locked configuration toward the unlocked configuration, the biasing spring 143 urges the pedal slider 138 to return back to the first end of the slot 142. As such, the pedal 30, pedal slider 138 and slot 142 are collectively configured to translate motion of the pedal 30 into movement of the pedal slider 138 within the slot 142, which in turn, causes movement of the braking cable 140.

Figure 10:
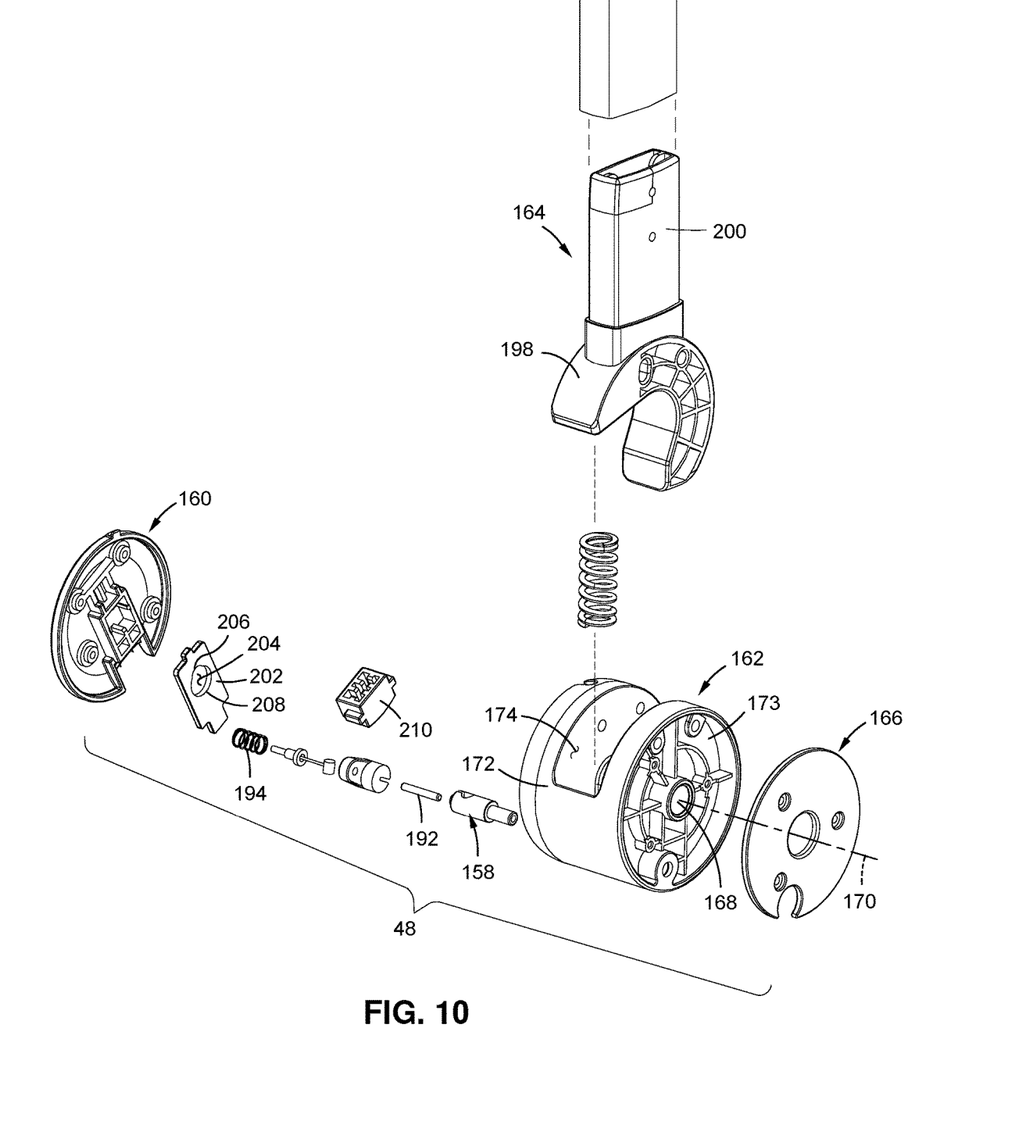
FIG. 10 is a medial perspective exploded view of a caster assembly.
Figure 11:
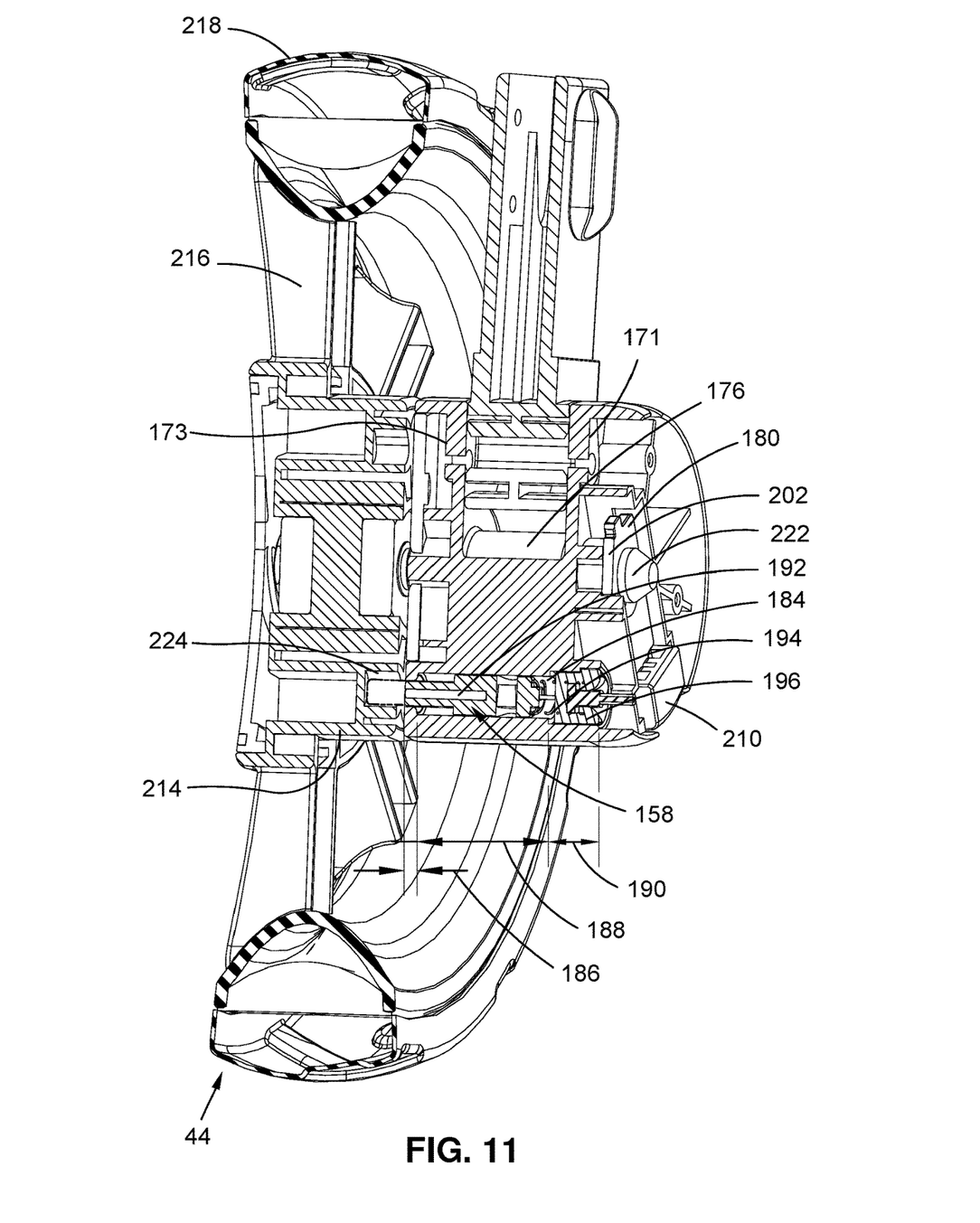
FIG. 11 is a cross sectional view of a rear caster engaged with a rear wheel.

Referring now to FIGS. 10-11, while one end portion of each braking cable 140 is attached to a respective pedal slider 138, the other end portion of each braking cable 140 is attached to a corresponding caster slider 158 disposed in a respective rear caster 48, as will be described in more detail below. Thus, each braking cable 140 extends between a pedal slider 138 and a caster slider 158.

Each rear caster 48 generally includes a medial cover plate 160, a rear caster body 162, a frame attachment element 164, and a lateral cover plate 166. For purposes of illustration, the frame attachment element 164 has been removed from FIG. 11 to provide a more accurate depiction of the internal components related to the locking feature.

According to one embodiment, the rear caster body 162 includes a central opening 168, which is disposed about a rear caster axis 170. The rear caster body 162 further includes a pair of opposed side walls 171, 173 extending generally perpendicularly to the rear caster axis 170, and an outer wall 172 disposed about the rear caster axis 170. According to one embodiment, the outer wall 172 extends in an axial direction beyond each of the side walls 171, 173 to form a peripheral flange about the side walls 171, 173. The medial cover plate 160 extends over side wall 171 and is circumnavigated by the flange extending around side wall 171, while the lateral cover plate 166 extends over side wall 173 and is circumnavigated by the flange extending around side wall 173.

The rear caster body 162 includes a brake bore 184 extending through the rear caster body 162, with the brake bore 184 being offset from, and extending generally parallel to the rear caster axis 170. The brake bore 184 includes several sections 186, 188, 190, with each section 186, 188, 190 having a different sized diameter. The brake bore 184 is adapted to receive the caster slider 158, which is coupled to the braking cable 140 and a braking pin 192, which extend from opposed ends of the caster slider 158. In this regard, the rear caster body 162 may include an opening or other similar structure to guide the braking cable 140 into the brake bore 184 to connect with the caster slider 158. The caster slider 158 is movable or translatable relative to the rear caster body 162 between an unlocked configuration and a locked configuration. In particular, transition of the caster slider 158 from the unlocked configuration toward the locked configuration results in movement of the caster slider 158 in a direction from the side wall 171 to the side wall 173. Conversely, transition of the caster slider 158 from the locked configuration toward the unlocked configuration results in movement of the caster slider 158 in a direction from the side wall 173 to the side wall 171.

A spring 194 extends between the caster slider 158 and a bore plug 196 to provide a biasing force on the caster slider 158, to urge the caster slider 158 toward the locked configuration. The bore plug 196 includes a central opening through which the braking cable 140 extends, with the bore plug 196 being adapted to reside within section 190 of the brake bore 184. The biasing force applied by the spring 194 to the caster slider 158 is intended to keep the braking cable 140 in tension by applying a force to the braking cable 140 which opposes the force applied to the other end of the braking cable 140 by the spring 143.

The rear caster body 162 further includes a cavity 174 extending into the rear caster body 162 from the outer wall 172, with the cavity 174 being configured to receive a corresponding portion of the frame attachment element 164. The cavity 174 is formed in spaced relation to the peripheral edges of the outer wall 172, and is generally U-shaped and only partially extends around the rear caster body 162. A portion of the cavity 174 is defined by an internal wall 176, which extends from the outer wall 172 and around a portion of the central opening 168. A first spring mount may extends into the cavity 174, and is adapted to mount with a spring, as will be described in more detail below.

The frame attachment element 164 includes an attachment body 198 which mates with the rear caster body 162. In the exemplary embodiment, the attachment body 198 is generally U-shaped, and is sized and configured to be received within the U-shaped cavity 174 formed in the rear caster body 162. The frame attachment element 164 may include a spring mount (not shown), with which a spring interfaces, opposite the corresponding spring mount formed on the rear caster body 162. Extending from the attachment body 198 is a frame connector 200 adapted to engage with the rear frame 16. For instance, the frame connector 200 may be received within a slot or opening formed within one of the side rails 26 of the rear frame 16 for connecting the rear caster 48 to the rear frame 16.

The rear caster 48 further includes a wheel lock 202 for mounting a rear wheel 44 to the rear caster body 162, while still allowing the rear wheel 44 to freely rotate about a rotation axis. In this regard, the wheel lock 202 is not a braking mechanism which prevents rotation of the rear wheel 44 relative to the rear caster body 162; rather, the wheel lock 202 is a device which is used to mount or secure the rear wheel 44 to the rear caster body 162. The wheel lock 202 includes an opening 204 having an outer periphery including a narrow section 206 and a wide section 208, the importance of which will be described in more detail below.

The wheel lock 202 is configured to be movable or translatable relative to the rear caster body 162 between wheel lock and wheel release positions. Along these lines, the rear caster body 162 includes a containment wall 180 defining a space within which the wheel lock 202 resides. In particular, the containment wall 180 extends away from side wall 171, with the containment wall 180 having a pair of ends disposed adjacent the outer wall 172 and in spaced relation to each other to define a gap. The containment wall 180 includes a middle segment which extends around the central opening 168. In this regard, the wheel lock 202 is positioned relative with the rear caster body 162 such that the wheel lock opening 204 is aligned with the central opening 168 on the rear caster body 162.

A wheel lock button 210 is connected to the wheel lock 202, with the wheel lock button 210 residing within the gap 182 and providing an external structure with which a user may interface for selectively transitioning the wheel lock 202 between the wheel lock and wheel release positions.

Referring now to FIGS. 2 and 11, the rear wheel 44 generally includes a wheel axle 212, a wheel hub 214, a plurality of spokes 216, and a tire 218. The wheel axle 212 is an elongate shaft having a circumferential groove 220 formed adjacent a distal end portion 222 thereof. The circumferential groove 220 is configured to interface with the wheel lock 202 for mounting the wheel 44 to the rear caster body 162. The wheel 44 is mounted to the rear caster body 162 by advancing the wheel axle 212 through the central opening 168 of the rear caster body 162, and with the distal end portion of the wheel axle 212 extending through wheel lock opening 204. Advancement of the wheel axle 212 through the wheel lock opening 204 is achieved when the wheel lock 202 is in the wheel release position. When the circumferential groove 220 is aligned with the wheel lock 202, the wheel lock 202 is transitioned from the wheel release to the wheel lock position, which results in a portion of the wheel lock 202 being advanced into the circumferential groove 220, which prevents withdrawal of the wheel axle 212 from the rear caster opening 168. In order to detach the wheel 44 from the rear caster 48, the wheel lock 202 is transitioned from the wheel lock position to the wheel release position, which removes the wheel lock from the circumferential groove 220, thereby allowing the wheel axle 212 to be withdrawn from the opening 168.

Extending radially outward from the wheel axle 212 is the wheel hub 214, which includes a plurality of openings or recesses 224 which are adapted to receive the braking pin 192 for braking the stroller 10, as will be described in more detail below. The recesses 224 are arranged about the wheel axle 212, with each recess 224 being formed about an axis which extends generally parallel to the wheel axle 212.

The spokes 216 extend radially outward from the hub 214 between the hub 214 and a wheel frame 226, which supports the tire 218.

With the basic structure of the braking system described above, operation of the braking system will now be described, particularly, the operative relationship between the pedal 30, pedal sliders 138, braking cable 140, braking pin 192, and wheel hub 214.

When the user wants to push the stroller 10, the pedal 30 is in the unlocked configuration, with the upper surface 52 of the pedal 30 being substantially flush with the upper surface 54 of the cross bar 50. As a result of the pedal 30 being in the unlocked configuration, the camming posts 64 are retracted from the pedal sliders 138, thereby allowing the pedal sliders 138 to assume their respective unlocked configurations, wherein the pedal sliders 138 are located within the first end portion 144 of the slot 142. Accordingly, the braking cable 140 is pulled toward the middle portion of the braking pedal 30. Since the braking pin 192 is coupled to the braking cable 140, such movement of the braking cable 140 results in the braking pin 192 assuming an unlocked configuration, wherein the braking pin 192 is retracted into the brake bore 184, and thus, the braking pin 192 is not advanced into any of the recesses 224 located on the wheel hub 214. Therefore, the braking pin 192 does not restrict rotation of the rear wheel 44, and thus, the rear wheel 44 is free to rotate as the stroller 10 is pushed.

When the user wants to actuate the braking system, the user presses on the pedal 30 with his or her foot, until the pedal 30 is in the locked configuration, with the upper surface 52 of the pedal 30 located below the upper surface 54 of the cross bar 50. When the pedal 30 is in the locked configuration, the pedal locking mechanism 90 maintains the pedal in such configuration until the pedal 30 is acted on again by the user. Movement of the pedal 30 from the unlocked configuration toward the locked configuration causes the camming posts 64 to be advanced into openings 154 of respective pedal sliders 138. The interaction between the camming surfaces 66 on the pedal sliders 138 results in movement of the pedal sliders 138 toward the second end portion 146 of the respective slots 142. Due to the interconnection of each braking pin 192 to a corresponding pedal slider 138 via the intervening braking cable 140, such movement of the pedal sliders 138 causes a distal end portion of the braking pin 192 to extend out of the brake bore 184 and into a recess 224 formed on the wheel hub 214 and aligned with the braking pin 192. When the distal end portion of the braking pin 192 is received within a recess 224 formed on the wheel hub 214, the braking pin 192 provides a rigid interconnection between the wheel hub 214 and the rear caster 48 which prevents rotation of the rear wheel 44 relative to the rear caster 48, and thus the rear wheels 44 are locked in place.

In order to unlock the rear wheels 44, the user presses on the pedal 30, which causes the pedal locking mechanism 90 to release the pedal 30 and allow the pedal 30 to transition back to the unlocked configuration. Movement of the pedal 30 to the unlocked configuration allows the pedal sliders 138 to move back to the first end portion 144 of the respective slot 142, thereby causing retraction of the braking pin 192 into the rear caster 48 via the interconnection therebetween by the braking cable 140. With the braking pin 192 retracted in the rear caster 48, the rear wheel 44 is free to rotate relative to the rear caster 48.

Accordingly, the braking system described herein provides an easy-to-use, robust braking system for a stroller 10, wherein the user may easily actuate or de-actuate the braking system with a simple motion of the user's foot. Pressing down on the pedal 30 actuates the braking system, and subsequent pressing down on the pedal 30 de-actuates the braking system.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:
1. A stroller comprising:
   a pair of wheels;
   a cross bar extending between the pair of wheels;
   a pedal coupled to the cross bar, and being selectively transitional relative to the cross bar between an unlocked position and a locked position;
   a pair of braking pins which are operatively coupled to the pedal by respective ones of a pair of braking cables, each braking pin being transitional relative to a respective one of the pair of wheels between a release position and a brake position, each braking pin being engaged with the respective one of the pair of wheels when the braking pin is in the brake position, each braking pin being disengaged with the respective one of the pair of wheels when the braking pin is in the release position, the pair of braking pins being coupled to the pedal such that movement of the pedal from the unlocked position to the locked position causes the pair of braking pins to transition to their respective brake positions, and movement of the pedal from the locked position to the unlocked position causes the pair of braking pins to transition to their respective release positions; and
   a pedal locking mechanism coupled to the pedal and the cross bar, the pedal locking mechanism being configured to retain the pedal in the locked position in response to the pedal being transitioned to the locked position.

2. The stroller recited in claim 1, wherein the pedal is biased toward the unlocked position.

3. The stroller recited in claim 1, wherein the pedal is located equidistantly between the pair of wheels.

4. The stroller recited in claim 1, wherein the pedal locking mechanism includes a primary locking element and a housing, the primary locking element being transitional between a first position associated with pedal being in the unlocked position, and a second position associated with the pedal being in the locked position, the primary locking element translating and rotating relative to the housing as the primary locking element transitions between the first position and the second position.

5. The stroller recited in claim 4, wherein the primary locking element includes a plurality of projections and the housing includes a plurality of grooves, the plurality of projections being received in respective ones of the plurality of grooves to control position of the primary locking element relative to the housing.

6. The stroller recited in claim 1, further comprising a pair of pedal sliders coupled to respective ones of the pair of braking cables and being translatable relative to the cross bar, the pedal sliders being operatively engaged with the pedal such that transition of the pedal between the unlocked position and the locked position results in translation of the pair of pedal sliders relative to the cross bar.

7. The stroller recited in claim 6, wherein the pedal moves along a pedal axis as the pedal transitions between the unlocked position and the locked position, the pedal axis being perpendicular to an axis about which the pair of wheels rotate.

8. The stroller recited in claim 7, wherein the pedal includes a pair of camming surfaces offset from the pedal axis, each camming surface interfacing with a respective one of the pair of pedal sliders to cause the pair of pedal sliders to move along an axis perpendicular to the pedal axis as the pedal transitions between the unlocked position and the locked position.

9. The stroller recited in claim 7, further comprising:
   a pair of casters positioned adjacent respective ones of the pair of wheels; and a pair of caster sliders disposed in respective ones of the pair of casters and coupled to respective ones of the pair of braking pins and respective ones of the pair of braking cables to correlate movement of the pair of pedal sliders to movement of the pair of caster sliders.

10. The stroller recited in claim 9, wherein the pair of wheels are detachable engaged with respective ones of the pair of casters.

11. The stroller recited in claim 1, wherein the pedal includes a pedal upper surface and the cross bar includes a cross bar upper surface, the pedal upper surface being flush with the cross bar upper surface when the pedal is in the unlocked position.

12. A stroller comprising:
a frame including a cross bar extending between lateral portions of the frame;
a pedal translatably coupled to the cross bar, and being selectively transitional relative to the cross bar between an unlocked position and a locked position; and
a pair of braking pins which are operatively coupled to the pedal by respective ones of a pair of braking cables, each braking pin being transitional relative to the frame between a release position and a brake position, each braking pin moving in a laterally outward direction away from the pedal as the braking pin moves from the release position toward the brake position;
the pair of braking pins being coupled to the pedal such that movement of the pedal from the unlocked position to the locked position causes the pair of braking pins to transition to their respective brake positions, and movement of the pedal from the locked position to the unlocked position causes the pair of braking pins to transition to their respective release positions.

13. The stroller recited in claim 12, further comprising a pedal locking mechanism coupled to the pedal and the cross bar, the pedal locking mechanism being configured to retain the pedal in the locked position in response to the pedal being transitioned to the locked position.

14. The stroller recited in claim 13, wherein the pedal locking mechanism includes a primary locking element and a housing, the primary locking element being transitional between a first position associated with pedal being in the unlocked position, and a second position associated with the pedal being in the locked position, the primary locking element translating and rotating relative to the housing as the primary locking element transitions between the first position and the second position.

15. The stroller recited in claim 14, wherein the primary locking element includes a plurality of projections and the housing includes a plurality of grooves, the plurality of projections being received in respective ones of the plurality of grooves to control position of the primary locking element relative to the housing.

16. The stroller recited in claim 12, further comprising a pair of pedal sliders coupled to respective ones of the pair of braking cables and being translatable relative to the cross bar, the pedal sliders being operatively engaged with the pedal such that transition of the pedal between the unlocked position and the locked position results in translation of the pair of pedal sliders relative to the cross bar.

17. The stroller recited in claim 16, wherein the pedal moves along a pedal axis as the pedal transitions between the unlocked position and the locked position, the pedal including a pair of camming surfaces offset from the pedal axis, each camming surface interfacing with a respective one of the pair of pedal sliders to cause the pair of pedal sliders to move along an axis perpendicular to the pedal axis as the pedal transitions between the unlocked position and the locked position.

* * * * *